United States Patent [19]

Murashiro et al.

[11] Patent Number: 5,378,392

[45] Date of Patent: Jan. 3, 1995

[54] ANTIFERROELECTRIC LIQUID CRYSTAL COMPOSITION

[75] Inventors: Katsuyuki Murashiro, Ichiharashi; Kikuchi Makoto, Kisarazushi; Terashima Kanetsugu, Ichiharashi, all of Japan

[73] Assignee: Chisso Corporation, Osaka, Japan

[21] Appl. No.: 917,346

[22] Filed: Jul. 23, 1992

[30] Foreign Application Priority Data

Jul. 29, 1991 [JP] Japan .................. 3-211661

[51] Int. Cl.$^6$ ............ C09K 19/52; C09K 19/12; C09K 19/20; G02F 1/13
[52] U.S. Cl. ............ 252/299.01; 252/299.61; 252/299.64; 252/299.65; 252/299.66; 252/299.67; 359/103
[58] Field of Search .......... 252/299.01, 299.61, 252/299.62, 299.63, 299.64, 299.65, 299.66, 299.67, 299.7; 359/103, 104

[56] References Cited

U.S. PATENT DOCUMENTS

| | | | |
|---|---|---|---|
| 5,102,576 | 4/1992 | Terashima et al. | 252/299.01 |
| 5,108,650 | 4/1992 | Koden et al. | 252/299.01 |
| 5,184,847 | 2/1993 | Suzuki et al. | 252/299.65 |
| 5,316,694 | 5/1994 | Murashiro et al. | 252/299.61 |

FOREIGN PATENT DOCUMENTS

| | | |
|---|---|---|
| 391439 | 10/1990 | European Pat. Off. |
| 0411122 | 2/1991 | European Pat. Off. |
| 0422613 | 4/1991 | European Pat. Off. |

OTHER PUBLICATIONS

Sado Takehara et al., Patent Abstracts of Japan, unexamined applications, C field, vol. 13, No. 56, Feb. 8, 1989.

*Primary Examiner*—Shean Wu
*Attorney, Agent, or Firm*—Wenderoth, Lind & Ponack

[57] ABSTRACT

An antiferroelectric mixture comprising first and second components is provided, the mixing proportions of the first and second components being 60-97 wt. % and 3-40 wt. % based upon the total weight of the two components, respectively, the first component being selected from the group consisting of compounds expressed by the formula (I) and the second component being selected from the group consisting of compounds expressed by the formula (II):

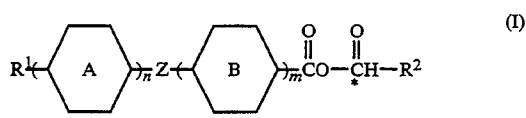

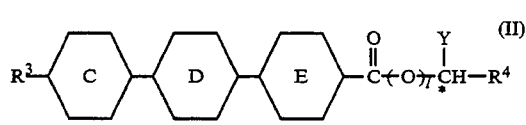

wherein $R^1$ and $R^3$ are $C_{1-18}$ alkyl or alkoxy, $R^2$ and $R^4$ are $C_{2-18}$ alkyl or alkoxy, X and Y are $-CH_3$, $-CF_3$ or $-C_2F_5$, rings A, B, C, D and E are 1,4-cyclohexylene, 1,4-phenylene an H atom of which may be replaced by a halogen atom or a cyano group, pyridine-2,5-diyl, pyrimidine-2,5-diyl, pyrazine-2,5-diyl or pyridazine-3,6-diyl, Z is $-COO-$, $-CH_2O-$ or $-OCH_2-$, m and n each are 1 or 2, (m+n) is 3, and Z is 0 or 1.

Using the above antiferroelectric liquid crystal composition, a light-switching element having improved the temperature-dependency of threshold electric field and capable of effecting a tristable switching at a high is obtained.

6 Claims, 2 Drawing Sheets

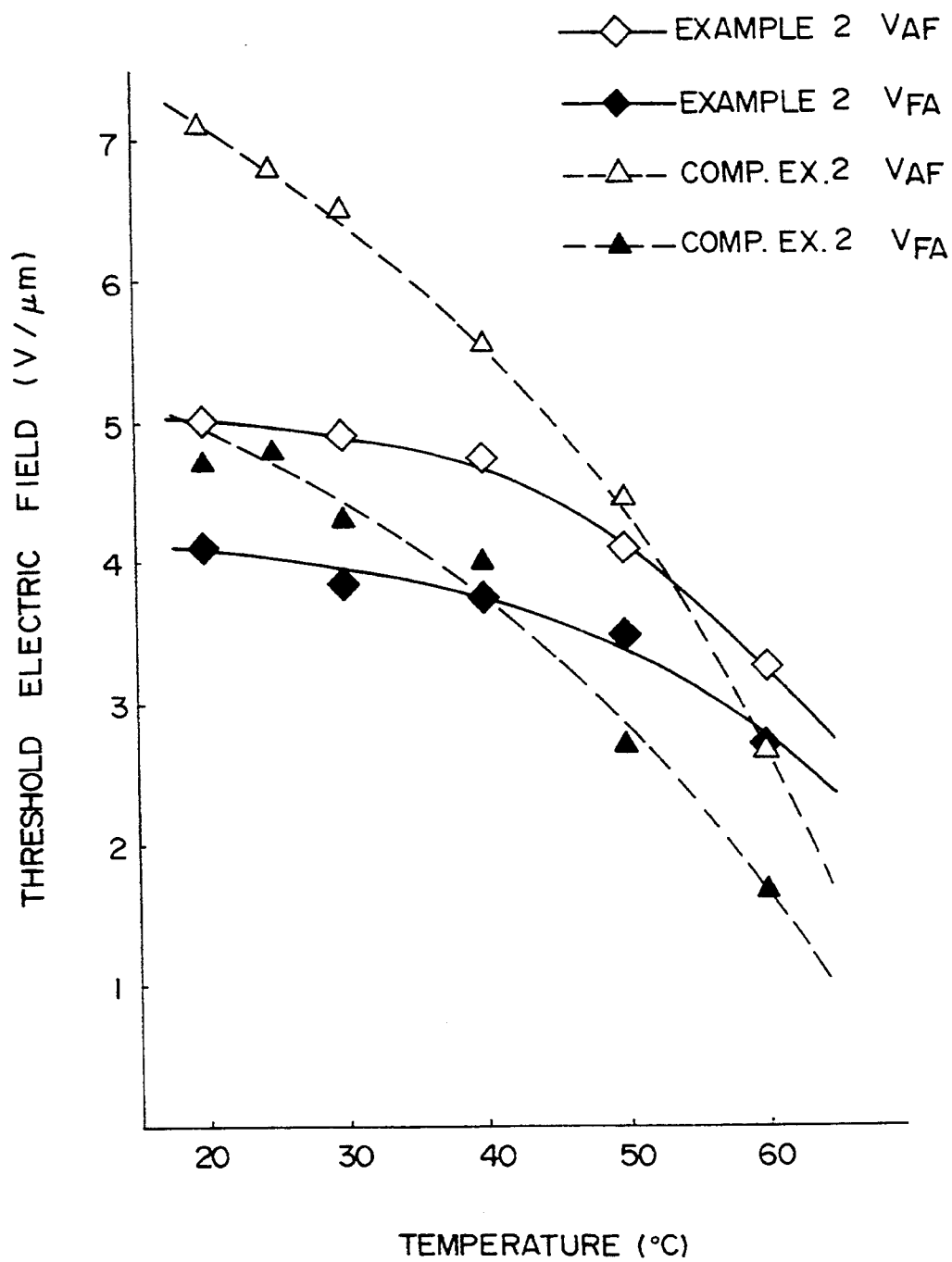

ANTIFERROELECTRIC LIQUID CRYSTAL COMPOSITION

BACKGROUND OF THE INVENTION

1. Field of the Invention

This invention relates to an antiferroelectric liquid crystal composition. Antiferroelectric liquid crystals have a notable threshold electric field when an antiferroelectric phase is changed to a ferroelectric phase or a ferroelectric phase is changed to an antiferroelectric phase, by impressing or removing an electric field. More particularly the present invention relates to an antiferroelectric liquid crystal composition having a small temperature-dependency of the threshold electric field and a light-switching device using the above composition.

2. Description of the Related Art

Liquid crystals have been broadly used as a material for display devices. Most liquid crystal display use materials belonging to nematic phase. Display quality has been improved by employing active matrix mode using a thin film transistor (TFT) as a switching transistor for the respective pixels, a supertwisted nematic birefringence display mode (STN mode) having the twist angle elevated up to 270°, or the like display modes, but such liquid crystal displays are inferior to display using a cathodic ray tube (CRT), in the aspect of the electrooptical response rate. As a material for overcoming such a drawback, a surface-stabilized ferroelectric liquid crystal display (SSFLC) mode using ferroelectric liquid crystals has been proposed by N. A. Clark and S. T. Lagewall in 1980, and since then, development of ferroelectric liquid crystal materials has been continued. The characteristics of this display element are as follows:

① its electrooptical response is rapid,
② it has memory properties,
③ its viewing angle is wide, etc.

The ferroelectric liquid crystals are materials potentially having a possibility of exhibiting a high density display.

However, as to the ferroelectric liquid crystal displays, a number of problems to be solved have been left behind. For example, there are ① inferior switching and ghost effect,
② inferior stability to mechanical shock, and
③ reduction in the brightness and contrast due to occurrence of chevron structure.

As a method for solving the essential problem of the SSFLC display mode, a display using antiferroelectric liquid crystals has been manufactured as a trial by Yamawaki et al (see Japan Display, 1989, preprints 3-3, page 26).

The antiferroelectric liquid crystal phase has been found by Furukawa et al in 1987 for the first time and named "chiral smectic Y (SY*) phase" (see the first Ferroelectric Liquid Crystal Society, preprints). Thereafter, it has been evidenced by Chandani et al that a SY* phase is antiferroelectric (see Japanese Journal of Applied physics, vol. 28, p. 1265 (1989)).

As to the antiferroelectric liquid crystal phase, when an electric field is impressed to the phase, a ferroelectric phase is formed, while when the electric field is removed, the ferroelectric phase returns to the antiferroelectric phase. Thus, there has been utilized for displays, a tristable switching between the bistable state in the ferroelectric phase and one stable state in the antiferroelectric phase.

The characteristic of this tristable switching consists in that steep threshold electric field characteristics and an optical hysteresis having a broad width are exhibited at the time of transition between the antiferroelectric phase and the ferroelectric phase. By utilizing this characteristic, it is possible to afford a display having a broad viewing angle to the same extent as that of SSFLC display and a high contrast.

As to the antiferroelectric phase, antiferroelectric phases of a chiral smectic C (SC*) phase and a chiral smectic I (SI*) phase have so far been reported, but antiferroelectric phase of a chiral smectic F (SF*) phase may also be present, taking its structure into account. The tristable switching is possible with any chiral smectic phases so long as the phases are those of antiferroelectric phases. However, among them, $SC_A^*$ phase which is antiferroelectric phase of SC* phase is preferred, taking a response rate into account.

The current antiferrostatic liquid crystal materials have the following problems:

① high driving voltage and
② large temperature-dependency of hysteresis characteristics.

Further, a few compositions exhibiting antiferroelectric liquid crystal phase are known. Thus, the above-mentioned problems have not yet been solved.

SUMMARY OF THE INVENTION

The first object of the present invention is to provide an antiferroelectric liquid crystal composition having improved temperature-dependency of the threshold electric field in the transition between $SC_A^*$ phase and SC* phase.

The second object of the present invention is to provide a light-switching element having improved temperature characteristics of the driving threshold electric field.

The first object of the present invention can be achieved according to the following item (1) and the embodiments are described in the following items (2) to (4), and the second object of the present invention can be achieved according to the following item (5):

(1) An antiferroelectric liquid crystal composition comprising first and second components, the first component thereof being at, least one compound expressed by the formula (I)

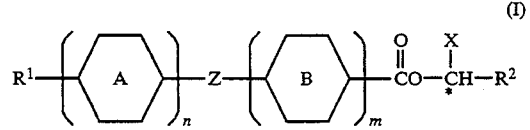

wherein $R^1$ represents an alkyl group or an alkoxy group of 1 to 18 carbon atoms, $R^2$ represents an alkyl group or an alkoxy group of 2 to 18 carbon atoms, X represents $-CH_3$, $-CF_3$ or $-C_2F_5$, six-membered rings A and B each independently represent 1,4-cyclohexylene, 1,4-phenylene one hydrogen atom of which may be replaced by a halogen atom or a cyano group, pyridine-2,5-diyl, pyrimidine-2,5-diyl, pyrazine-2,5-diyl or pyridazine-3,6-diyl, Z represents $-COO-$, $-CH_2O-$ or $-OCH_2-$, m and n each represent an integer of 1 or 2, (m+n) being 3, and * represents a chiral carbon atom, and having an antiferroelectric chiral smectic C phase, and the second component thereof being at least one compound expressed by the formula (II)

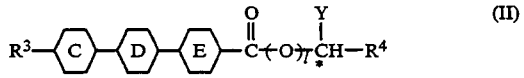
(II)

wherein $R^3$ represents an alkyl group or an alkoxy group of 1 to 18 carbon atoms, $R^4$ represents an alkyl group or an alkoxy group of 2 to 18 carbon atoms, Y represents —CH$_3$, CF$_3$ or —C$_2$F$_5$, six-membered rings C, D and E each independently represent 1,4-cyclohexylene, 1,4-phenylene one hydrogen atom of which may be replaced by a halogen atom or a cyano group, pyridine-2,5-diyl, pyrimidine-2,5-diyl, pyrazine-2,5-diyl or pyridazine-3,6-diyl, l represents an integer of 0 or 1 and * represents a chiral carbon atom, and;

the content of said first component and that of said second component, each in said composition belong 60 to 97% by weight and 3 to 40% by weight, based upon the total quantity of the first component and the second component, respectively.

(2) An antiferroelectric liquid crystal composition according to item (1), wherein said second component comprises at least one of compounds expressed by the formula (II-1)

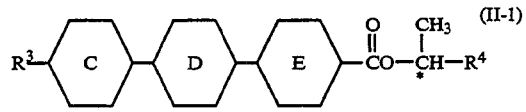
(II-1)

wherein $R^3$ represents an alkyl group or an alkoxy group of 3 to 10 carbon atoms, $R^4$ represents an alkyl group of 2 to 8 carbon atoms, six-membered ring C represents 1,4-cyclohexylene or 1,4-phenylene, six-membered rings D and E each represent 1,4-phenylene, pyridine-2,5-diyl or pyrimidine-2,5-diyl and * represents chiral carbon atom.

(3) An antiferroelectric liquid crystal composition according to item (1), wherein said second component comprises at least one of compounds expressed by the formula (II-2) or (II-3)

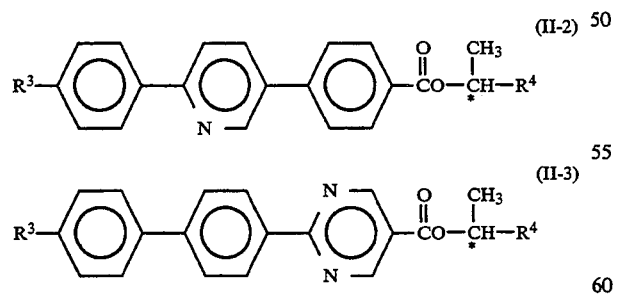
(II-2)

(II-3)

wherein $R^3$ represents a linear alkyl group of 3 to 9 carbon atoms and $R^4$ represents a linear alkyl group of 3 to 6 carbon atoms.

(4) An antiferroelectric liquid crystal composition according to item (1), wherein said first component comprises at least one of compounds expressed by the formula (I-1)

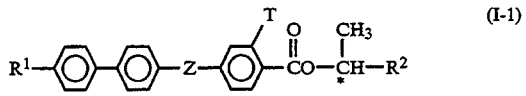
(I-1)

wherein $R^1$ represents a linear alkyl group or alkoxy group of 6 to 14 carbon atoms, $R^2$ represents a linear alkyl group of 2 to 8 carbon atoms, T represents a hydrogen atom or a halogen atom of F or CA and Z represents —COO—, —CH$_2$O— or —OCH$_2$—.

(5) A light-switching element using an antiferroelectric liquid crystal composition according to any one of items (1) to (4).

DESCRIPTION OF THE ACCOMPANYING DRAWINGS

FIG. 2 shows a chart illustrating curves obtained by plotting the respective changes depending upon temperatures, of threshold electric fields in Example 2 add Comparative example 2.

DETAILED DESCRIPTION OF PREFERRED EMBODIMENTS

Figure 1:
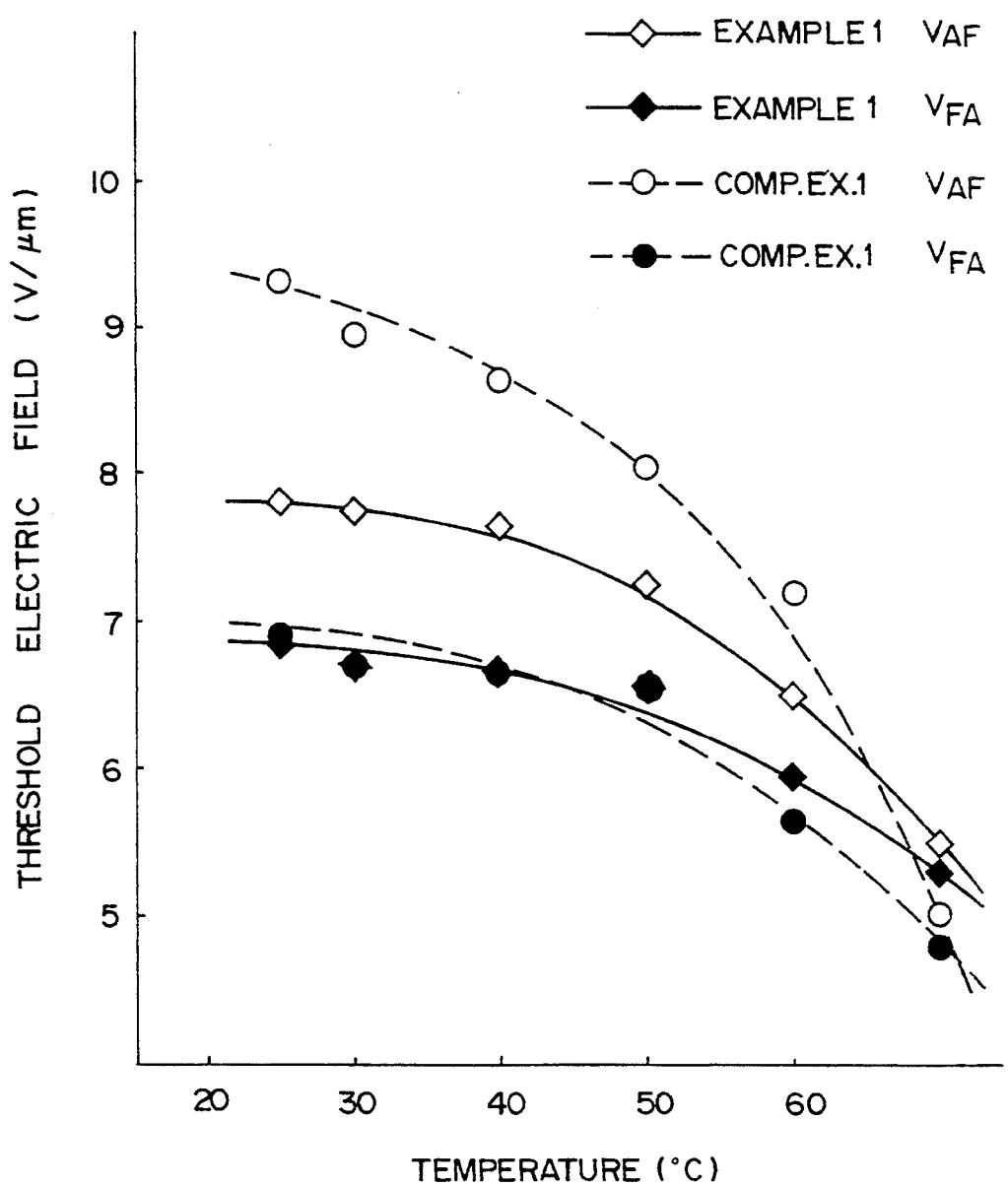
FIG. 1 shows a chart illustrating curves obtained by plotting the respective changes depending upon temperatures, of threshold electric field in Example 1 and Comparative example 1.

The compounds used as the first component in the present invention are optically active liquid crystal compounds expressed by the above formula (I) and exhibiting SC$_A$* phase. Among these compounds, those expressed by the above formula (I-1) are preferably used. Besides, compounds of the formula (I-1) wherein T represents H and one hydrogen atom of the biphenylene ring is replaced by F or Cl, or p-substituted benzoic acid esters of 4-hydroxy-4'-(1-methylalkoxycarbonyl)-biphenyls (compounds of the formula (I) wherein n=1 and m=2) are preferably used.

As more preferable compounds of the first component, those of the formula (I-1) wherein $R^1$ represents a linear alkyl group or alkoxy group of 6 to 12 carbon atoms, $R^2$ represents a linear alkyl group of 2 to 6 carbon atoms and T represents F atom are exemplified. Examples of these optically active liquid crystals are as follows:

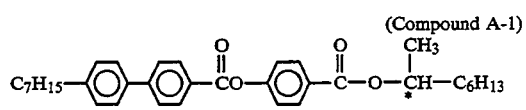
(Compound A-1)

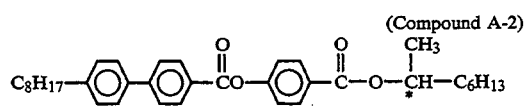
(Compound A-2)

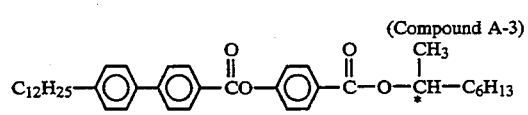
(Compound A-3)

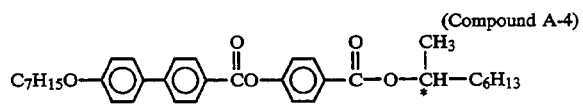
(Compound A-4)

-continued
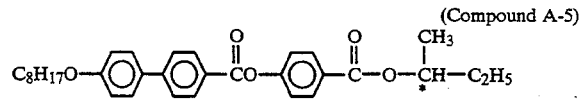
(Compound A-5)
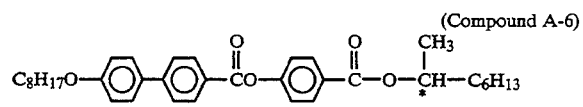
(Compound A-6)
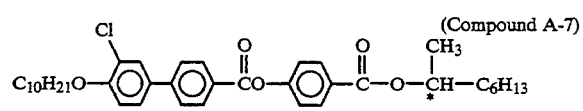
(Compound A-7)
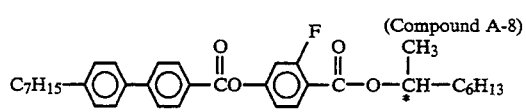
(Compound A-8)
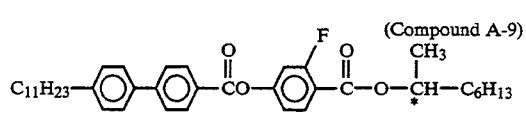
(Compound A-9)
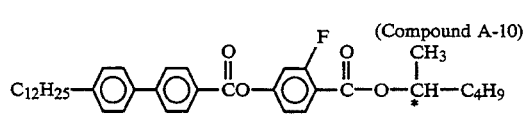
(Compound A-10)
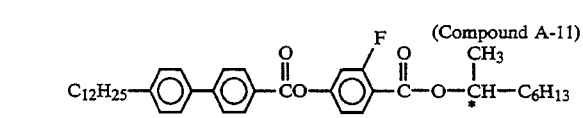
(Compound A-11)
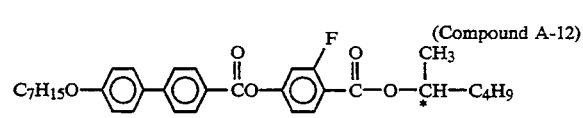
(Compound A-12)
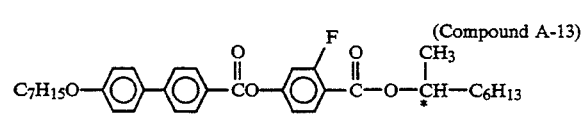
(Compound A-13)
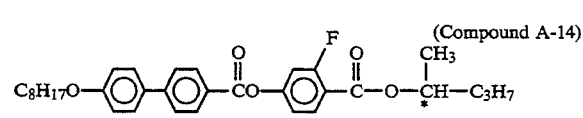
(Compound A-14)
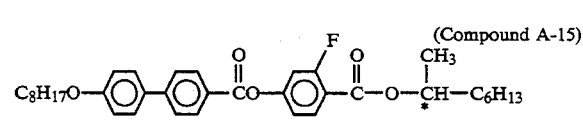
(Compound A-15)
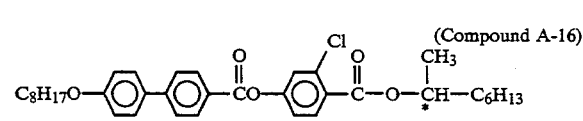
(Compound A-16)
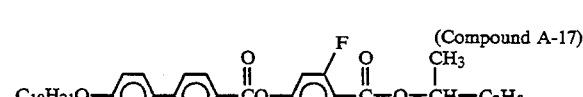
(Compound A-17)
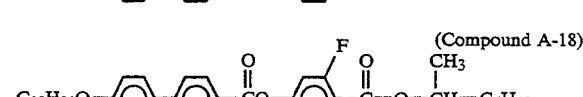
(Compound A-18)
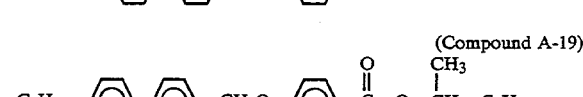
(Compound A-19)
-continued
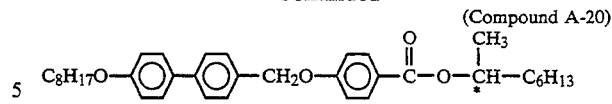
(Compound A-20)
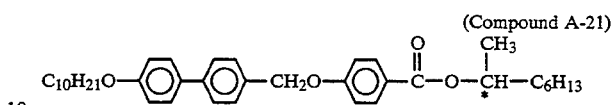
(Compound A-21)
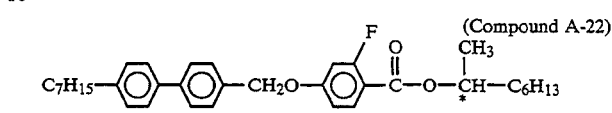
(Compound A-22)
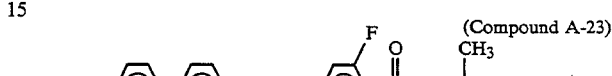
(Compound A-23)
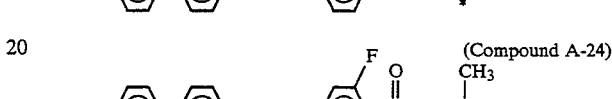
(Compound A-24)
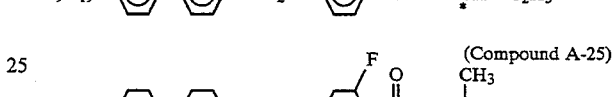
(Compound A-25)
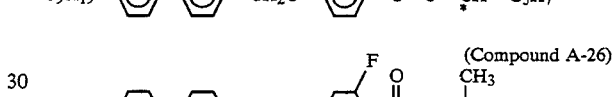
(Compound A-26)
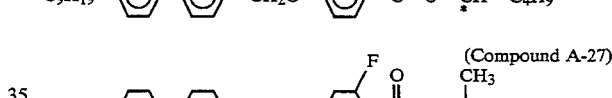
(Compound A-27)
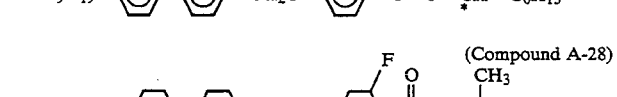
(Compound A-28)
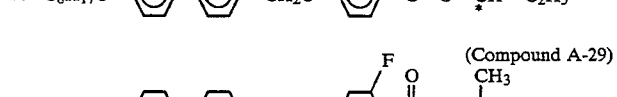
(Compound A-29)
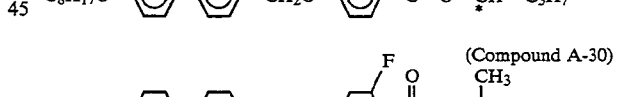
(Compound A-30)
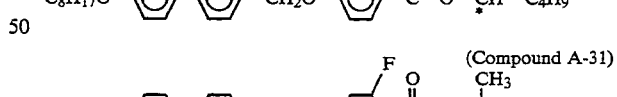
(Compound A-31)
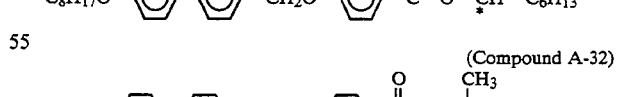
(Compound A-32)
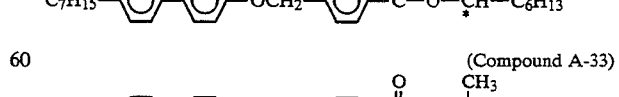
(Compound A-33)
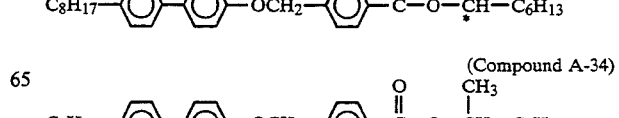
(Compound A-34)

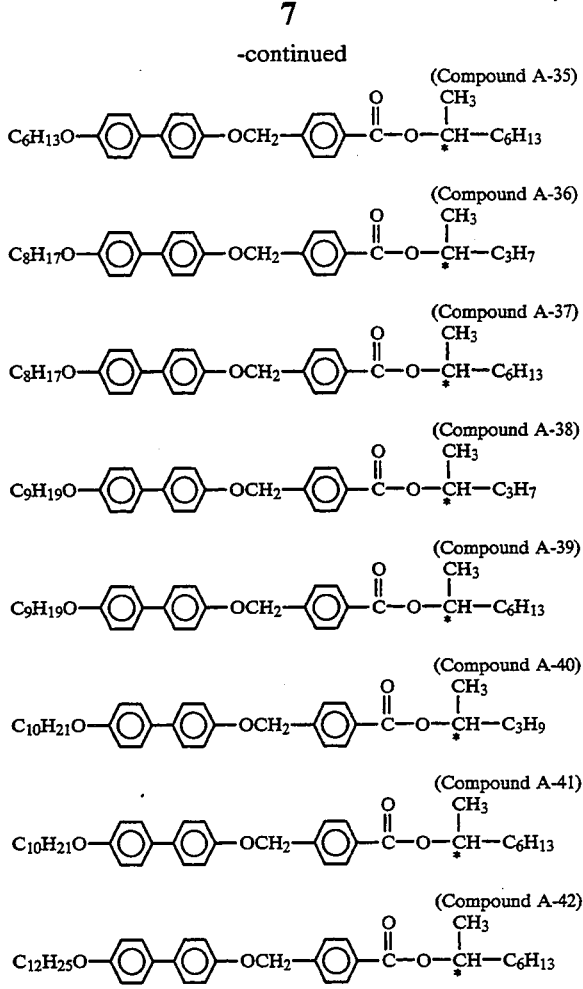

Further, as compounds which are not included among those of the formula (I-1), but preferably used as the first component, the following optically active liquid crystals are exemplified:

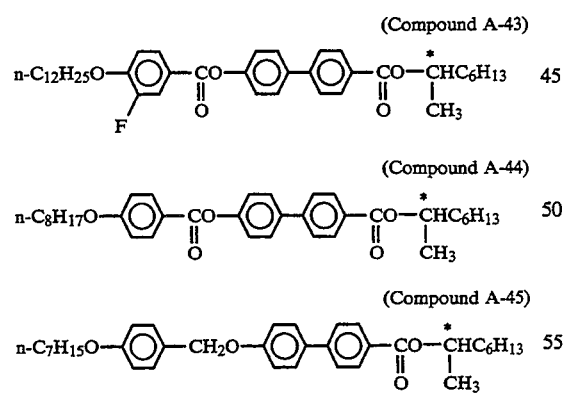

The optically active liquid crystals used as the first component have an antiferroelectric phase. In order to effect an antiferroelectric phase in the liquid crystal composition of the present invention, the mixing proportion of the first component is 60 to 97% by weight based upon the total weight of the first component and the second component. The preferable mixing proportion of the first component is 70 to 95% by weight. If the mixing proportion of the first component is less than 60% by weight, the mixing proportion of the second component not always having an antiferroelectric phase increases relatively, so that the antiferroelectric phase becomes extinct or the upper limit temperature of the antiferroelectric phase lowers.

As to the compounds of the first component, if the absolute configuration at the chiral center thereof is of R type, the helical twist senses in the antiferroelectric phase and the ferroelectric phase are generally right. If the absolute configuration is of S-type, the helical senses are generally left. The helical twist senses of the compounds of the second component described below are similarly determined according to the absolute configuration at the chiral center, as in the case of the compounds of the first component.

In the present invention, when the compounds of the first component and the second component are adequately chosen from among those having an absolute configuration of R-type and those having that of S-type and mixed together, it is possible to elongate the helical pitches in the antiferroelectric phase and the ferroelectric phase of the resulting composition.

Exhibition of the antiferroelectric phase of compounds of the first component can be confirmed by observation of its texture under a polarising microscope and besides, the presence of hysteresis of apparent tilt angle vs. impressed voltage curve in the electrooptical response of liquid crystal elements and exhibition of the tristable switching in the electrooptical response.

As the second component in the present invention, optically active compounds expressed by the above formula (II) are usable. As the compounds of the second component, optically active liquid crystal compounds exhibiting the antiferroelectric phase are preferred, but even in the case of compounds exhibiting no antiferroelectric phase, if they are soluble in the antiferroelectric phase and the ferroelectric liquid crystal phase, compounds expressed by the formula (II) are usable.

As the second component, the optically active compounds expressed by the above formula (II-1) are preferably used, and those expressed by the above formula (II-2) or (II-3) are more preferably used. These compounds are expressed by e.g. the following formulas:

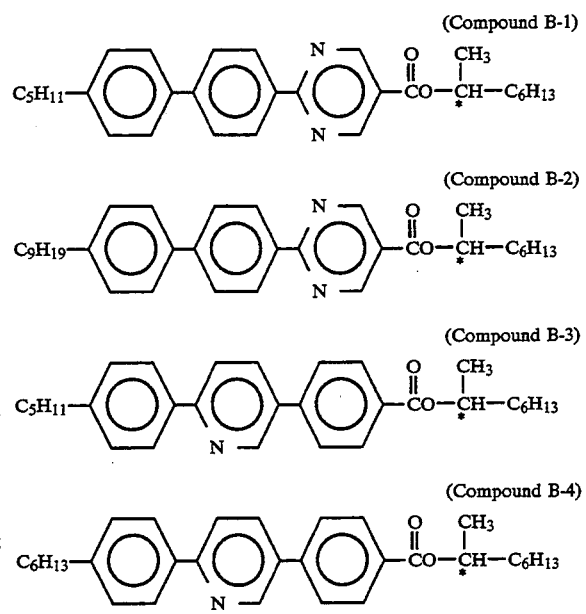

-continued (Compound B-5) C$_4$H$_9$—⟨phenyl⟩—⟨pyrimidine(N,N)⟩—⟨phenyl⟩—CO—O—*CH(CH$_3$)—C$_6$H$_{13}$ (Compound B-6) C$_5$H$_{11}$—⟨cyclohexyl⟩—⟨phenyl⟩—⟨phenyl⟩—CO—O—*CH(CH$_3$)—C$_6$H$_{13}$ (Compound B-7) C$_6$H$_{13}$O—⟨phenyl⟩—⟨phenyl⟩—⟨pyrimidine⟩—CO—O—*CH(CH$_3$)—C$_3$H$_7$ (Compound B-8) C$_{10}$H$_{21}$O—⟨phenyl⟩—⟨pyridine⟩—⟨phenyl⟩—CO—O—*CH(CH$_3$)—C$_3$H$_7$ (Compound B-9) C$_8$H$_{17}$O—⟨phenyl⟩—⟨pyrimidine⟩—⟨phenyl⟩—CO—O—*CH(CH$_3$)—C$_2$H$_5$ (Compound B-10) C$_8$H$_{17}$—⟨phenyl⟩—⟨pyridine⟩—⟨phenyl⟩—CO—O—*CH(CH$_3$)—C$_3$H$_7$ (Compound B-11) C$_7$H$_{15}$—⟨cyclohexyl⟩—⟨phenyl⟩—⟨phenyl⟩—CO—O—*CH(CH$_3$)—C$_3$H$_7$ (Compound B-12) C$_3$H$_7$—⟨cyclohexyl⟩—⟨phenyl⟩—⟨phenyl⟩—CO—O—*CH(CH$_3$)—C$_8$H$_{17}$ (Compound B-13) C$_7$H$_{15}$—⟨phenyl⟩—⟨phenyl⟩—⟨pyrimidine⟩—CO—O—*CH(CH$_3$)—C$_6$H$_{13}$ (Compound B-14) C$_8$H$_{17}$—⟨phenyl⟩—⟨phenyl⟩—⟨pyridine⟩—CO—O—*CH(CH$_3$)—C$_4$H$_9$ (Compound B-15) C$_{11}$H$_{23}$O—⟨phenyl⟩—⟨pyrimidine⟩—⟨phenyl⟩—CO—O—*CH(CH$_3$)—C$_3$H$_7$ (Compound B-16) C$_8$H$_{17}$—⟨phenyl⟩—⟨pyridine⟩—⟨phenyl⟩—CO—O—*CH(CH$_3$)—C$_6$H$_{13}$ (Compound B-17) C$_{12}$H$_{25}$—⟨phenyl⟩—⟨pyridine⟩—⟨phenyl⟩—CO—O—*CH(CH$_3$)—C$_6$H$_{13}$ (Compound B-18) C$_8$H$_{13}$O—⟨phenyl⟩—⟨phenyl⟩—⟨phenyl⟩—CO—O—*CH(CH$_3$)—C$_6$H$_{13}$ Among these compounds, compound B-4 exhibits a SC$_A$* phase and the following phase transition points during the temperature rise:

Cr 52.4; S$_3$ 79.0; SC$_A$I 94.0; SC* 118.5    I

Cr, SC*, SC$_A$* and I herein referred to mean crystal phase, chiral smectic C phase, antiferroelectric chiral smectic C phase and isotropic liquid phase, respectively, S$_3$ refers to an unidentified smectic phase and the numerals refer to phase transition points (°C.).

Further, compound B-1 has the following phase transition points during the temperature rise:

Cr 102.5, (SE 100.8); SA 108.2    I and this compound exhibits no antiferroelectric phase. SE referred to herein means smectic E phase and the numeral within the parentheses means a monotropic phase transition point.

One of the two optically active liquid crystals exemplified therein has an antiferroelectric phase and the other thereof exhibits no antiferroelectric phase, but both belong to the above formula (II-1), and when they are used as the second component of the present invention, it is possible to reduce the temperature-dependency of the threshold electric field in the phase transition due to the electric field impressed between the antiferroelectric phase and the ferroelectric phase of the resulting antiferroelectric liquid crystals.

The mixing proportion of the second component is 3 to 40% by weight, preferably 5 to 30% by weight, based upon the total quantity of the first component and the second component.

Further, when the second component is added, it is possible to reduce the threshold electric field of the phase transition between the antiferroelectric phase and the ferroelectric phase.

As to the composition of the present invention, in order to reduce its viscosity, broaden the temperature range of the antiferroelectric phase or reduce the threshold electric field of the phase transition accompanying the impression of the electric field, it is possible to add a third component besides the first component and the second component, within a range in which the object of the present invention is not damaged.

As compounds used for these purposes, the following compounds are exemplified:

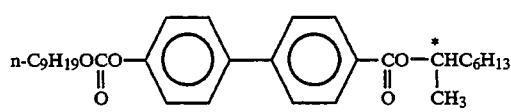 (Compound C-1)
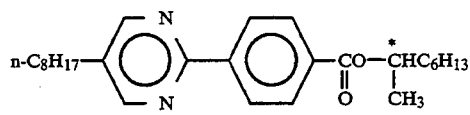 (Compound C-2)
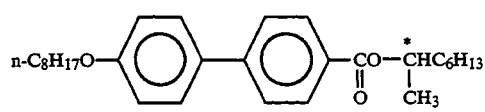 (Compound C-3)
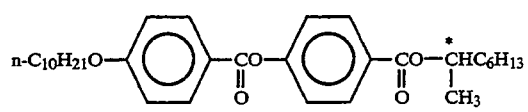 (Compound C-4)
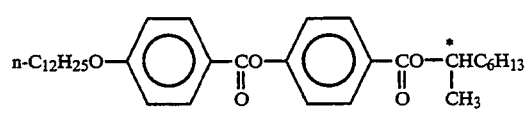 (Compound C-5)
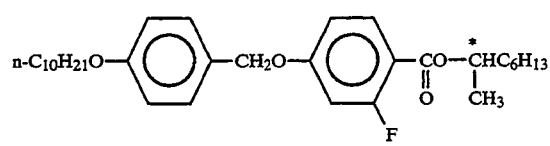 (Compound C-6)
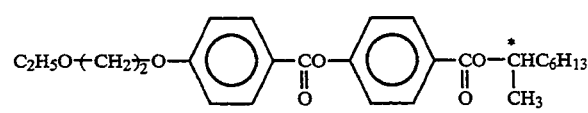 (Compound C-7)
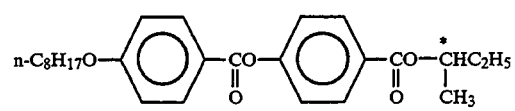 (Compound C-8)
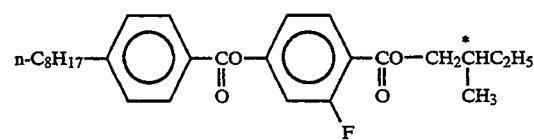 (Compound C-9)
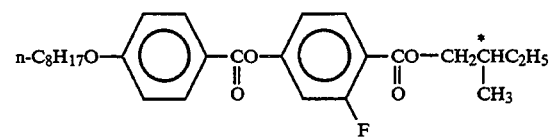 (Compound C-10)
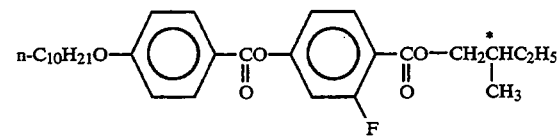 (Compound C-11)
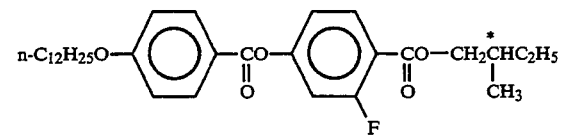 (Compound C-12)

-continued
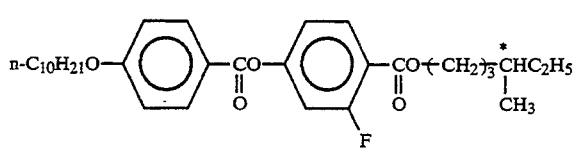
(Compound C-13)
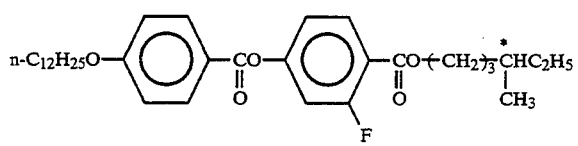
(Compound C-14)
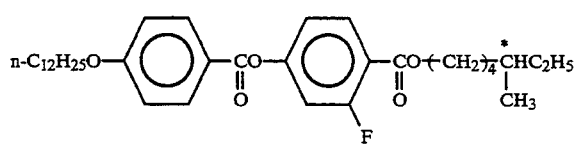
(Compound C-15)
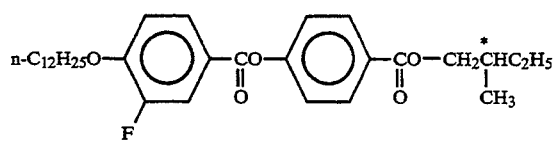
(Compound C-16)
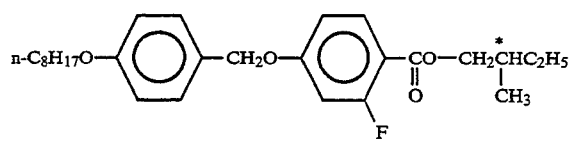
(Compound C-17)
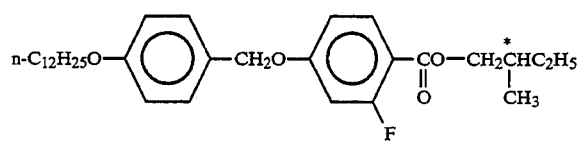
(Compound C-18)
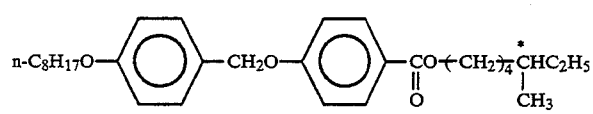
(Compound C-19)
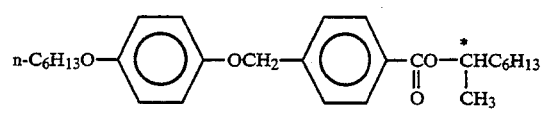
(Compound C-20)
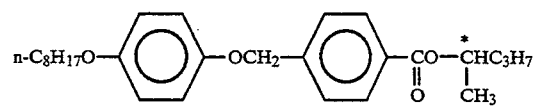
(Compound C-21)
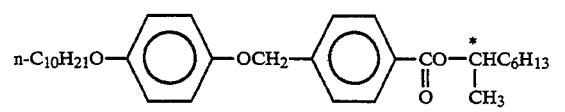
(Compound C-22)
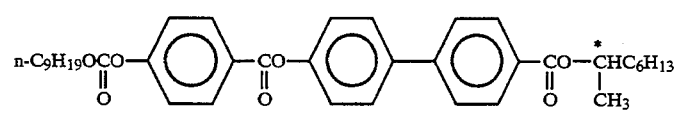
(Compound C-23)

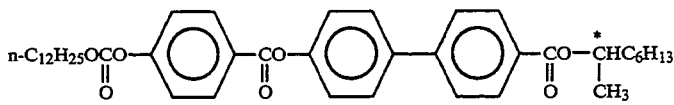
(Compound C-24)

The light-switching element of the present invention belongs to the surface-stabilized ferroelectric liquid crystal (SSFLC) mode proposed by Lagerwall et al. As the light-switching element of the present invention, it is possible to use an element composed of a pair of substrates obtained by rubbing an aligning film coated on a set of transparent electrodes opposed to each other, as in the case of conventional elements using ferroelectric liquid crystals, but it is preferred to use an element composed of a pair of substrates obtained by subjecting only one of the substrates to rubbing treatment, in the aspect of alignment of liquid crystal materials. The light-switching element of the present invention is characterized by using a liquid crystal material by use of which the threshold electric field of the phase transition between the antiferroelectric phase and the ferroelectric phase is not greatly influenced by the temperature change.

In the light-switching element of the present invention, it is also possible to use an antiferroelectric liquid crystal composition having added a dichroic dyestuff in order to broaden the angle of view.

The present invention provides an antiferroelectric liquid crystal composition having improved temperature-dependency of threshold electric field required for the transition between the antiferroelectric phase and the ferroelectric phase. Further, by using this antiferroelectric liquid crystal composition, a light-switching element capable of effecting a tristable switching and exhibiting a superior contrast is provided.

EXAMPLE

The present invention will be described in more detail by way of Examples and Comparative examples.

In Examples and Comparative examples, liquid crystal materials were filled in the form of liquid phase in a cell obtained by rubbing one of a set of glass substrates having coated an aligning film of Poval (polyvinyl alcohol) onto the substrates each provided with transparent electrodes, the substrates being opposed to each other and having an electrode distance of 5 μm, followed by gradually cooling the resulting liquid crystal cell to make up $SC_A^*$ phase. The threshold electric field at the transition between the antiferroelectric phase and the ferroelectric phase was sought by observing the optical response and the impressed electric field at the time of having impressed a triangular wave of 5 mHz across the liquid crystal, by means of a two-channel oscilloscope, followed by measuring the change in the optical response under an impressed electric field properly selected depending upon the objective threshold field.

Example 1

Using the above-mentioned compounds A-11 and A-18 as the first component and the above-mentioned compound B-4 as the second component, the following mixture was prepared:
Compound A-11 45% by weight
Compound A-18 45% by weight and
Compound B-4 10% by weight.

This mixture exhibited the following phase transition points during the temperature rise:

Cr −36.5; $SC_A^*$ 95.6; $SC_\gamma^*$ 96.1; $SC^*$ 97.5; $SA$ 112.9          I and also exhibited an antiferroelectric phase within a broad temperature range including room temperature. $SC_\gamma^*$ therein refers to a ferroelectric phase. Further, this mixture exhibited good aligning properties and had a contrast ratio of 20:1. The values of the threshold electric field (abbreviated to $V_{AF}$) at the transition from the antiferroelectric phase to the ferroelectric phase and the threshold electric field (abbreviated to $V_{FA}$) at the transition from the ferroelectric phase to the antiferroelectric phase, each at various temperatures were plotted. The resulting curves are shown in FIG. 1.

Comparative Example 1

In the case of the following mixture containing no second component in the mixture of Example 1:
Compound A-11 50% by weight and
Compound A-18 50% by weight,
its phase transition points during the temperature rise were observed to exhibit the following values:

Cr −14.5; $SC_A^*$ 95.6; $SC^*$ 99.9; $SA$ 110.7          I that is, the mixture exhibited an antiferroelectric phase within a broad temperature range including room temperature. The values of $V_{AF}$ and $V_{FA}$ were plotted. The results are shown in FIG. 1.

Example 2

A mixture consisting of Compound A-3 (90 parts by weight) as a first component and Compound B-1 (10 parts by weight) as a second component exhibited the following phase transition points during the temperature rise:

Cr 7.3; $SC_A^*$ 74.7; $SC_\gamma^*$ 76.0; $SC^*$ 78.7; $SA$ 95.8          I that is, the mixture exhibited an antiferroelectric phase within a broad range including room temperature. Further, the mixture exhibited a good alignment. The values of $V_{AF}$ and $V_{FA}$ are shown in FIG. 2.

Comparative Example 2

A mixture wherein the second component in Example 2 was replaced by Compound A-33 (10 parts by weight), that is, consisting only of the first components, was prepared. This mixture exhibited the following phase transition points during the temperature rise:

Cr 10.5; $SC_A^*$ 68.7; $SC_\gamma^*$ 73.4; $SC^*$ 79.9; $SA$ 91.7          I that is, the mixture exhibited an antiferroelectric phase within a broad range including room temperature. The values of $V_{AF}$ and $V_{FA}$ of the mixture are shown in FIG. 2.

Example 3

Using the aforementioned compounds A-6, A-9 and A-11 as the first component and the aforementioned compound B-4 as the second component, a mixture consisting of the following compounds was prepared:
Compound A-6 10% by weight
Compound A-9 40% by weight
Compound A-11 40% by weight and
Compound B-4 10% by weight.

This mixture exhibited the following phase transition temperatures during the temperature rise:

Cr −10; SC$_A$* 82.2; SC* 83.5; SA 100.6 and also exhibited an antiferroelectric phase within a wide temperature range including room temperature. The mixture exhibited V$_{AF}$ and V$_{FA}$ values at 25° C. of 9.8 V/μm and 8.0 V/μm, respectively.

Example 4

There was composed a set of glass substrates provided with a pair of transparent electrodes having coated a polyimide aligning film, the glass substrates being opposed to each other and having a cell gap of 2 μm, and only one substrate of the set being subjected to rubbing treatment. An antiferroelectric liquid crystal mixture prepared in Example 2 was filled in the above composed set to prepare a liquid crystal cell. This liquid crystal cell was placed between two polarizing plates arranged in a crossed nicol state, so that the director of liquid crystal molecules could accord with the polarizing direction of one of the polarizing plates when no electric field was applied, followed by impressing a square wave of 100 Hz. As a result, a clear switching operation could be observed. The contrast ratio at the time of optical response was 20:1.

What we claim is:

1. An antiferroelectric liquid crystal composition comprising first and second components, the first component thereof being at least one compound expressed by the formula:

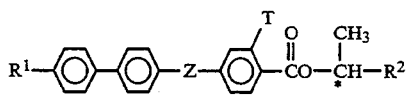

wherein R$^1$ represents a linear alkyl group or alkoxy group of 6 to 14 carbon atoms, R$^2$ represents a linear alkyl group of 2 to 8 carbon atoms, T represents a hydrogen atom, F or Cl and Z represents —COO—, —CH$_2$O— or —OCH$_2$—, and having an antiferroelectric chiral smectic C phase, and the second component thereof being at least one compound expressed by the formula:

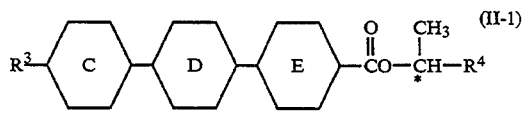

wherein R$^3$ represents an alkyl group or an alkoxy group of 3 to 10 carbon atoms, R$^4$ represents an alkyl group of 2 to 8 carbon atoms, six-membered ring C represents 1,4-phenylene or 1,4-cyclohexylene, six-membered rings D and E each independently represent 1,4-phenylene, pyridin-2,5-diyl or pyrimidin-2,5-diyl, and * indicates a chiral carbon atom, the content of said first component and that of said second component, each in said composition being 60 to 97% by weight and 3 to 40% by weight, based upon the total quantity of the first component and the second component, respectively.

2. An antiferroelectric liquid crystal composition according to claim 1, wherein said second component comprises at least one compound selected from the group consisting of the following compounds (B-1) to (B-18):

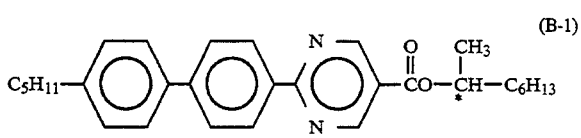

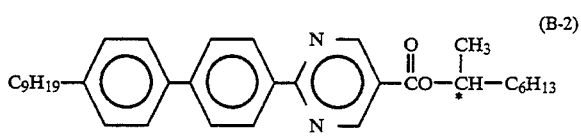

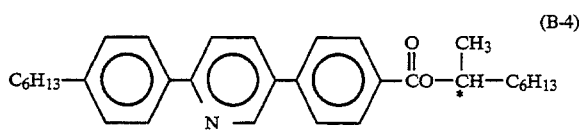

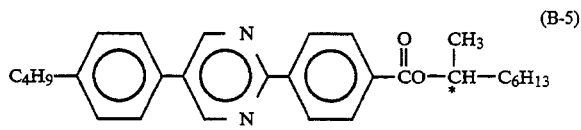

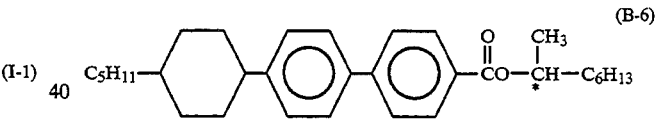

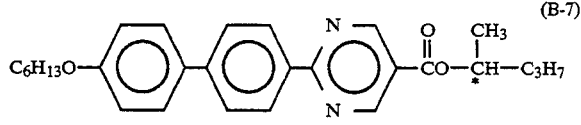

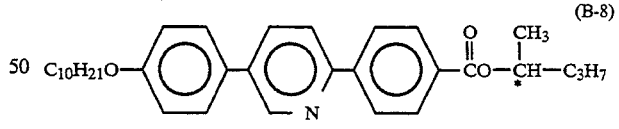

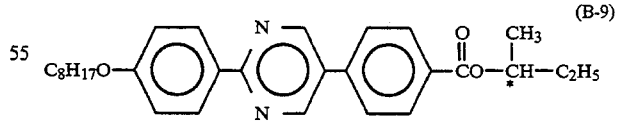

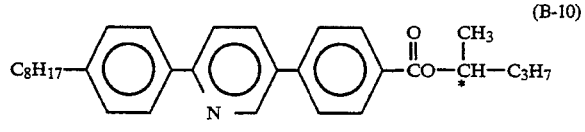

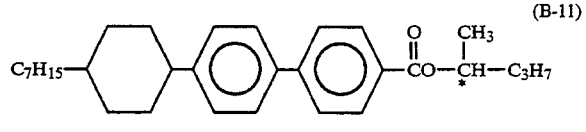

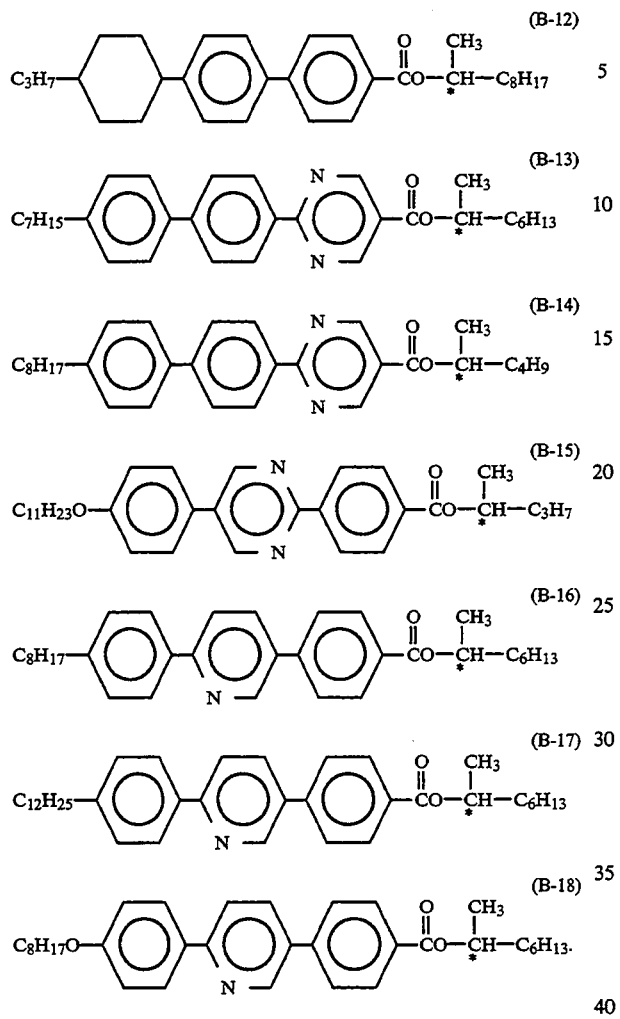
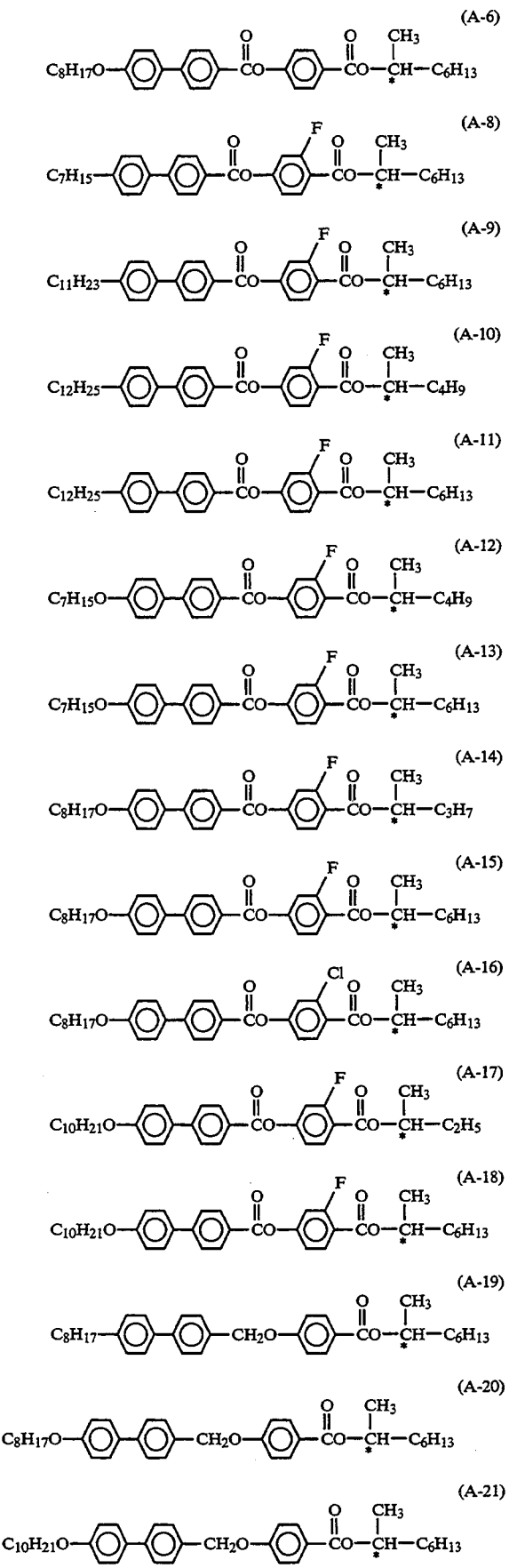
3. An antiferroelectric liquid crystal composition according to claim 1, wherein said first component comprises at least one compound selected from the group consisting of the following compounds (A-1) to (A-6) and compounds (A-8) to (A-42):

(A-22) C₇H₁₅—⟨⟩—⟨⟩—CH₂O—⟨F⟩—CO—*CH(CH₃)—C₆H₁₃

(A-23) C₈H₁₇—⟨⟩—⟨⟩—CH₂O—⟨F⟩—CO—*CH(CH₃)—C₆H₁₃

(A-24) C₉H₁₉—⟨⟩—⟨⟩—CH₂O—⟨F⟩—CO—*CH(CH₃)—C₂H₅

(A-25) C₉H₁₉—⟨⟩—⟨⟩—CH₂O—⟨F⟩—CO—*CH(CH₃)—C₃H₇

(A-26) C₉H₁₉—⟨⟩—⟨⟩—CH₂O—⟨F⟩—CO—*CH(CH₃)—C₄H₉

(A-27) C₉H₁₉—⟨⟩—⟨⟩—CH₂O—⟨F⟩—CO—*CH(CH₃)—C₆H₁₃

(A-28) C₈H₁₇O—⟨⟩—⟨⟩—CH₂O—⟨F⟩—CO—*CH(CH₃)—C₂H₅

(A-29) C₈H₁₇O—⟨⟩—⟨⟩—CH₂O—⟨F⟩—CO—*CH(CH₃)—C₃H₇

(A-30) C₈H₁₇O—⟨⟩—⟨⟩—CH₂O—⟨F⟩—CO—*CH(CH₃)—C₄H₉

(A-31) C₈H₁₇O—⟨⟩—⟨⟩—CH₂O—⟨F⟩—CO—*CH(CH₃)—C₆H₁₃

(A-32) C₇H₁₅—⟨⟩—⟨⟩—OCH₂—⟨⟩—CO—*CH(CH₃)—C₆H₁₃

(A-33) C₈H₁₇—⟨⟩—⟨⟩—OCH₂—⟨⟩—CO—*CH(CH₃)—C₆H₁₃

(A-34) C₅H₁₁—⟨⟩—⟨⟩—OCH₂—⟨⟩—CO—*CH(CH₃)—C₃H₇

(A-35) C₆H₁₃O—⟨⟩—⟨⟩—OCH₂—⟨⟩—CO—*CH(CH₃)—C₆H₁₃

(A-36) C₈H₁₇O—⟨⟩—⟨⟩—OCH₂—⟨⟩—CO—*CH(CH₃)—C₃H₇

(A-37) C₈H₁₇O—⟨⟩—⟨⟩—OCH₂—⟨⟩—CO—*CH(CH₃)—C₆H₁₃

(A-38) C₉H₁₉O—⟨⟩—⟨⟩—OCH₂—⟨⟩—CO—*CH(CH₃)—C₃H₇

(A-39) C₉H₁₉O—⟨⟩—⟨⟩—OCH₂—⟨⟩—CO—*CH(CH₃)—C₆H₁₃

(A-40) C₁₀H₂₁O—⟨⟩—⟨⟩—OCH₂—⟨⟩—CO—*CH(CH₃)—C₃H₇

(A-41) C₁₀H₂₁O—⟨⟩—⟨⟩—OCH₂—⟨⟩—CO—*CH(CH₃)—C₆H₁₃

(A-42) C₁₂H₂₅O—⟨⟩—⟨⟩—OCH₂—⟨⟩—CO—*CH(CH₃)—C₆H₁₃.

4. An antiferroelectric liquid crystal composition according to claim 1, wherein said second component comprises at least one of compounds expressed by the formula (II-2) or (II-3)

(II-2) $R^3$—⟨⟩—⟨N⟩—⟨⟩—CO—O—*CH(CH₃)—$R^4$ (II-3) $R^3$—⟨⟩—⟨⟩—⟨N,N⟩—CO—O—*CH(CH₃)—$R^4$ wherein $R^3$ represents a linear alkyl group of 3 to 9 carbon atoms and $R^4$ represents a linear alkyl group of 3 to 6 carbon atoms.

5. A light-switching element using an antiferroelectric liquid crystal composition according to claim 1.

6. A light-switching element using an antiferroelectric liquid crystal composition according to claim 4.

* * * * *